J. H. HUTH.
PIPE CONNECTION AND METHOD OF MAKING THE SAME.
APPLICATION FILED JAN. 14, 1920.
1,345,543.
Patented July 6, 1920.
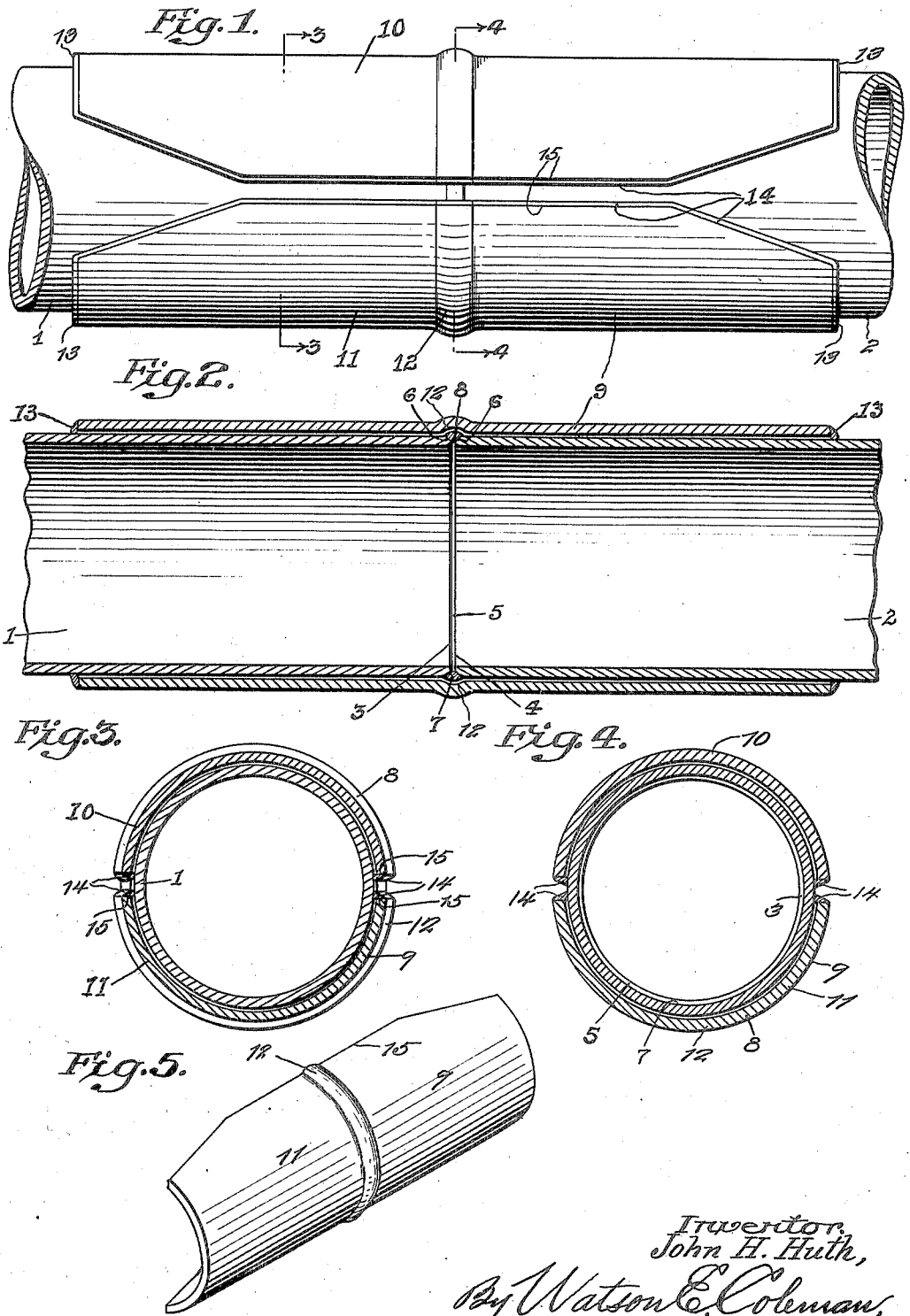
Inventor.
John H. Huth,
By Watson E. Coleman,
his Attorney.

UNITED STATES PATENT OFFICE.

JOHN H. HUTH, OF PHILADELPHIA, PENNSYLVANIA.

PIPE CONNECTION AND METHOD OF MAKING THE SAME.

1,345,543.  Specification of Letters Patent.  Patented July 6, 1920.

Application filed January 14, 1920. Serial No. 351,324.

*To all whom it may concern:*

Be it known that I, JOHN H. HUTH, a citizen of the United States, residing at Philadelphia, in the county of Philadelphia and State of Pennsylvania, have invented certain new and useful Improvements in Pipe Connections and Methods of Making the Same, of which the following is a specification, reference being had to the accompanying drawings.

This invention relates to an improved pipe connection and method of making the same, and one of the objects of the invention is the provision of a pipe connection of a welded character between two pipe sections, so as to render the joint between the two sections water tight before placing a sleeve over the welded connection, so that after a sleeve is slipped over the pipe connections and over the weld between the sections, the sleeve is also welded, thereby making a doubly water tight joint.

Heretofore pipe sections have been connected by means of a butt-weld, but there has been no provision for protecting such joint, and furthermore, there has been no provision of a space between the pipe sections, that is to say, where the ends of the pipe meet, so as to insure a proper butt-weld. In other words, in the attempts to make butt-welds, particularly in connection with sleeves, the pipe sections have been brought together in contact, and it is herein maintained that butt-welds cannot be made as advantageously with the ends of the pipe sections in engagement.

In the present invention, it is not only the aim to leave a space between the adjacent ends of the pipe sections, but also to form slight bevels on the marginal edges, so that in making the butt-weld a weld ridge is effected around the pipe at the point where the pipe sections adjoin, and by means of a saddle or sleeve fitted over the ridge, and then butt-welded to the pipe sections, the joint is doubly water tight.

Another object of the invention is to provide a doubly water tight joint consisting of a butt-welding of two pipe sections and the sleeve overlying such weld and also butt-welded to the pipe sections, so as to withstand a very high water pressure, whereas joints heretofore employed will not withstand such a high water pressure.

Owing to the heretofore mentioned butt-welds being flush with the pipe sections they will only withstand low water pressure, whereas the idea of the sleeve and the saddle allowing a weld to be made about a half an inch high or more, a greater pressure will be permitted.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in elevation of two pipe sections united by means of a butt-weld, and also showing the protecting sleeve butt-welded to the pipe sections.

Fig. 2 is a longitudinal sectional view through Fig. 1,

Fig. 3 is a cross sectional view on line 3—3 of Fig. 1,

Fig. 4 is a sectional view on line 4—4 of Fig. 1, and

Fig. 5 is a detail perspective view of one of the semi-circular sections of the sleeve.

Referring more especially to the drawings, 1 and 2 designate two pipe sections which are adapted to be united, so as to insure a doubly water tight joint. These pipe sections in practice are disposed so that their adjacent ends 3 and 4 are slightly spaced, in other words, to provide a clearance 5. The adjacent ends 3 and 4 have marginal bevels 6, which, when the adjacent ends are brought together as heretofore stated, cause a space 7 to be formed. This space 7 receives a suitable saddle 8 whereby the adjacent ends of the two pipe sections may be electrically butt-welded together.

In order to insure the doubly water tight joint between the two pipe sections, a suitable sleeve 9 is fitted over the sections as shown clearly in Figs. 1 and 2. This sleeve 9 comprises the two semi-circular sections 10 and 11. Substantially the central portions of the semi-circular sleeve sections are provided with grooves 12, which when the sleeve sections are placed on the pipe sections overlie the saddle 8, in order to protect the electrical butt-weld. These sleeve sections are preferably of the shape shown in Fig. 1, though not necessarily, and by means of the saddles 13 and 14 (which are adjacent the remote ends and the adjacent longitudinal edges of the sleeve section) the sleeve sections may be electrically butt-welded to the pipe sections, thereby not only insuring greater strength and rigidity between the pipe sections, but also making a doubly water tight joint, and one which will withstand a very great water pressure, for instance, anywhere from five hundred to twelve hundred pounds more or less, though not necessarily, and also to provide a joint which can be used at a small expense, and yet permit a reasonable profit to be made.

The saddles 14 adjacent the longitudinal edges 15 act as means to insure secure electrical butt-welds between said longitudinal edges as well as between said edges and the pipe sections. The word saddle, used in this specification is an accepted trade term, and is used to define the character of welds set forth in connection with this invention.

The invention having been set forth, what is claimed as new and useful is:

1. The combination with two pipe sections having their adjacent ends electrically butt-welded, the adjacent ends of the sections being disposed so as to provide a clearance space, of a saddle having connections with the adjacent edges of the two pipe sections when the ends are butt-welded, of sleeve sections fitting the pipe sections and having grooves overlying and engaging the electrical butt-weld of the two pipe sections, the remote ends and the longitudinal edges of the sleeve sections having electrical butt-weld with the pipe sections, thereby doubly insuring water tight joints between the pipe sections.

2. The combination with two pipe sections having their adjacent ends disposed with a clearance space between them and being electrically butt-welded, the outer marginal portions of the adjacent ends being beveled forming an annular V-shaped space, of a saddle engaging said annular V-shaped space to further insure an electrical butt-weld, a pair of sleeve sections fitting the pipe sections and having grooves engaging and overlying the saddle, the remote ends of the sleeve sections having saddles and being electrically butt-welded to the sleeve sections, so as to doubly insure a water tight joint between the pipe sections.

In testimony whereof I hereunto affix my signature.

JOHN H. HUTH.